(12) United States Patent
Palazzolo

(10) Patent No.: US 10,352,434 B2
(45) Date of Patent: Jul. 16, 2019

(54) DISTRIBUTION OF OIL TO THE INPUT BEARING AND SEAL OF A TRANSFER CASE

(71) Applicant: BorgWarner Inc., Auburn Hills, MI (US)

(72) Inventor: Michael R. Palazzolo, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 236 days.

(21) Appl. No.: 15/412,403

(22) Filed: Jan. 23, 2017

(65) Prior Publication Data

US 2017/0219084 A1    Aug. 3, 2017

Related U.S. Application Data

(60) Provisional application No. 62/288,076, filed on Jan. 28, 2016.

(51) Int. Cl.

| | |
|---|---|
| *F16H 3/08* | (2006.01) |
| *F16J 15/54* | (2006.01) |
| *F16J 15/00* | (2006.01) |
| *F16H 57/04* | (2010.01) |
| *B60K 17/344* | (2006.01) |
| *F16H 57/021* | (2012.01) |
| *F16H 57/029* | (2012.01) |
| *B60K 17/02* | (2006.01) |
| *B60K 17/04* | (2006.01) |
| *B60K 17/346* | (2006.01) |
| *B60K 17/35* | (2006.01) |
| *F16H 57/12* | (2006.01) |
| *F16H 1/28* | (2006.01) |

(52) U.S. Cl.
CPC ......... *F16H 57/0423* (2013.01); *B60K 17/02* (2013.01); *B60K 17/046* (2013.01); *B60K 17/344* (2013.01); *B60K 17/3465* (2013.01); *B60K 17/351* (2013.01); *F16H 57/021* (2013.01); *F16H 57/029* (2013.01); *F16H 57/0424* (2013.01); *F16H 57/0471* (2013.01); *F16H 57/12* (2013.01); *F16H 1/28* (2013.01); *F16H 2700/00* (2013.01); *Y10S 903/91* (2013.01); *Y10S 903/916* (2013.01)

(58) Field of Classification Search
CPC .............. F16H 3/08; F16J 15/00; F16J 15/54
See application file for complete search history.

(56) References Cited

U.S. PATENT DOCUMENTS

| | | | | |
|---|---|---|---|---|
| 2,935,889 A | * | 5/1960 | Adams | .................. F16D 13/74 |
| | | | | 112/256 |
| 3,378,104 A | * | 4/1968 | Venable | .................. F01D 25/18 |
| | | | | 184/6.12 |
| 5,494,173 A | * | 2/1996 | Deister | ...................... B07B 1/42 |
| | | | | 209/326 |

FOREIGN PATENT DOCUMENTS

CN    202203348 U  *  4/2012  ............... F16H 3/08

\* cited by examiner

*Primary Examiner* — Tisha D Lewis
(74) *Attorney, Agent, or Firm* — BrooksGroup

(57) ABSTRACT

A product may include a case, and a shaft that rotates may extend into the case. A bearing may support the shaft at the case. A seal may be positioned around the shaft outboard from the bearing. The bearing may have a first side facing the seal and a second side facing away from the seal. The case may define an inlet to an area between the bearing and the seal. A baffle may extend over the inlet on the second side and radially outside the bearing.

14 Claims, 3 Drawing Sheets

DISTRIBUTION OF OIL TO THE INPUT BEARING AND SEAL OF A TRANSFER CASE

CROSS-REFERENCE TO RELATED APPLICATIONS

This application claims the benefit of U.S. Provisional Application Ser. No. 62/288,076 filed Jan. 28, 2016.

TECHNICAL FIELD

The field to which the disclosure generally relates includes vehicle drivelines and more particularly, includes vehicle drivelines with all-wheel-drive drive capability.

BACKGROUND

Vehicle drivelines may include a combustion engine, an electric motor, or another power plant for propulsion. Hybrid vehicles may include a combination of different types of power plants. An all-wheel drive, or four-wheel-drive vehicle, may include a connection between each wheel and one or more power plants. The connections may include devices to provide one or more gear ratios, or one or more ranges of operation, or one or more functional modes.

SUMMARY OF ILLUSTRATIVE VARIATIONS

According to a number of illustrative variations, a product may include a case, and a shaft that rotates may extend into the case. A bearing may support the shaft at the case. A seal may be positioned around the shaft outboard from the bearing. The bearing may have a first side facing the seal and a second side facing away from the seal. The case may define an inlet to an area between the bearing and the seal. A baffle may extend over the inlet on the second side and radially outside the bearing Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
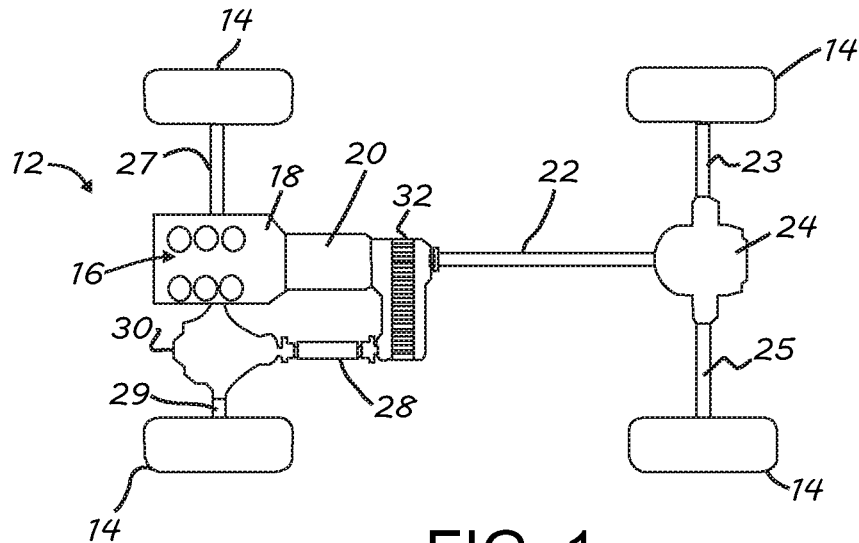
FIG. 1 is a schematic illustration of a vehicle according to a number of variations.

In a number of variations as illustrated in FIG. 1 a vehicle 12 may include a number of wheels 14, any number of which may be driven by a power plant 16. The power plant 16 may include an internal combustion engine 18 and transmission 20, or may include an alternative power source or a combination of power sources such as electric, hybrid, or other options. The vehicle 12 may include a propulsion shaft 22 that may be used to supply power from the power plant 16 to two of the wheels 14, which may be delivered through a differential 24 and axle shafts 23, 25. Another propulsion shaft 28 may be used to supply power from the power plant 16 to another two of the wheels 14, which may be delivered through a differential 30 and axle shafts 27, 29. A transfer case 32 may be connected between the power plant 16 and each of the propulsion shafts 22, 28, and may distribute power from the power plant 16 to one or both of the propulsion shafts 22, 28.

Figure 2:
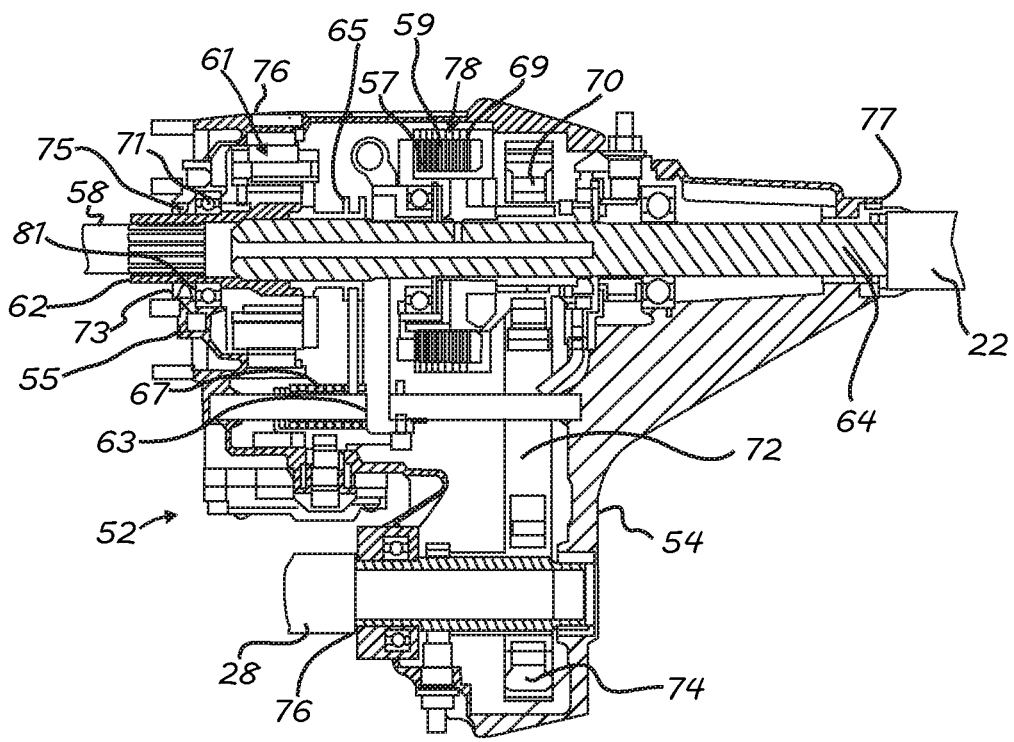
FIG. 2 is a schematic illustration of a transfer case according to a number of variations.

In a number of variations as illustrated in FIG. 2, a product 52 may be used as the transfer case 32 or otherwise to provide power from a power plant to one or more propulsion shafts. The product 52 may include a case 54 into which an input shaft 62 may extend. The input shaft 62 may receive input from a power plant through an engaged driving shaft 58. Torque may be delivered through the input shaft 62 which, for example, may be interconnected to the propulsion shaft 28. In a two-wheel drive mode power may flow from the driving shaft 58 to an output shaft 64 and to the propulsion shaft 22. The output shaft 64 may be connected with the input shaft 62 by a high-low range collar 65 which may be engaged with the input shaft 62 and may be slip-splined on the output shaft 64.

Torque may also be delivered to a propulsion shaft such as the propulsion shaft 28, through an output shaft 76. A sprocket 70 may be rotationally positioned on the output shaft 64 and may be engaged to drive a chain 72. The chain 72 may be engaged with another sprocket 74 that may be connected to the output shaft 76. In a number of variations a coupling 78 may selectively engage and disengage the output shaft 64 and the sprocket 70. The coupling 78 may include a clutch that may have a series of opposing friction discs, or may include another type of coupling engagement mechanism. In a number of variations an inner set of friction discs 57 may be connected with the output shaft 64. An interleaved outer set of friction discs 59 may be connected with a clutch housing 69. The clutch housing 69 may be engaged with the sprocket 70. The coupling 78 may selectively engage the output shaft 64 and the sprocket 70. To operate the product in a two-wheel drive mode, the coupling 78 may disengage the output shaft 64 from the sprocket 70 so that they are not fixed to rotate together. Pressure may be relieved from the sets of friction discs 57, 59 so that they do not transfer torque. To operate the product 52 in an all-wheel-drive mode, or four wheel drive mode, pressure may be selectively applied to the sets of friction discs 57, 59 by a clutch actuator 63 so that they transfer torque from the output shaft 64 to the sprocket 70. As a result, both propulsion shafts 22 and 28 may be driven. A high and low range may be effected by an actuator 67 that may move the range collar 65 to change the power flow through the planetary gear set 61 in a known manner.

In a number of variations the product 52 may have a number of rotating and translating components that may be lubricated by an oil contained in the case 54. These components may include a bearing 71 and a seal assembly 73 through which the input shaft 62 extends where it enters the case 54. Providing optimal oil flow to the bearing 71 and the seal assembly 73 may be challenging. The challenges may be compounded in applications where the product 52 may be installed in a vehicle in a tiled orientation so that the input side 75 where the input shaft 62 passes into the case 54 may be at a higher elevation than the output side 77 where the output shaft 64 passes out of the case 54.

In a number of variations, the case 54 may include a section 55 that may serve as an end enclosure around the input shaft 62. The section 55 may be connected with the remainder of the case 54 by a number of fasteners so that it may be removed, or may be otherwise connected to the remainder of the case 54, or integrally formed therewith. The section 55 may support the bearing 71 and the seal assembly 73. The section 55 may form a cup shaped extension 76 of the case 54 and may extend at least partially around the planetary gear set 61.

Figure 3:
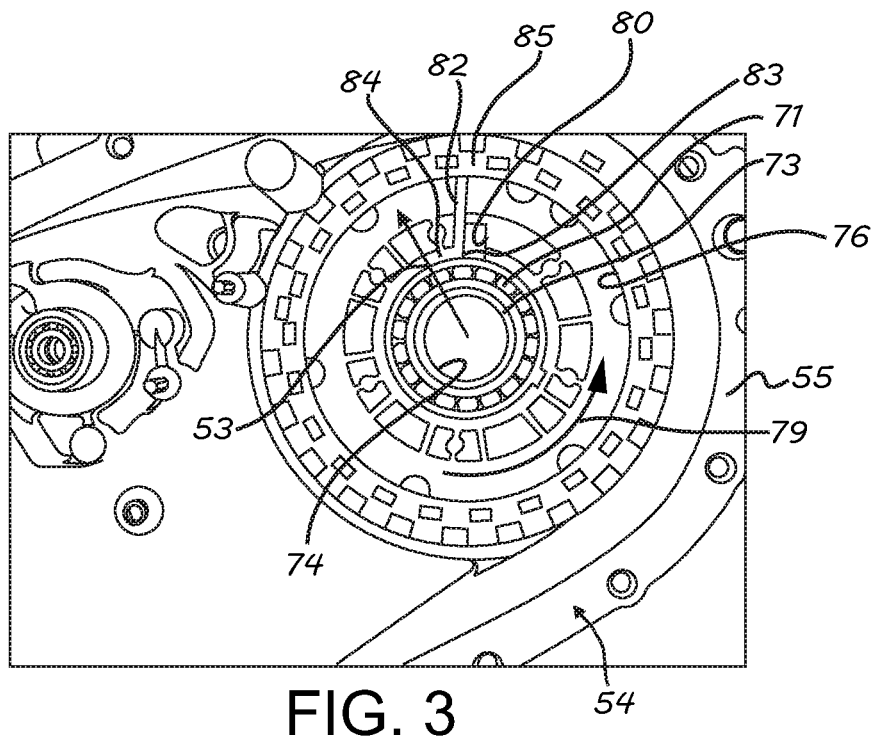
FIG. 3 is a partial outline illustration of a section of a transfer case according to a number of variations.
Figure 4:
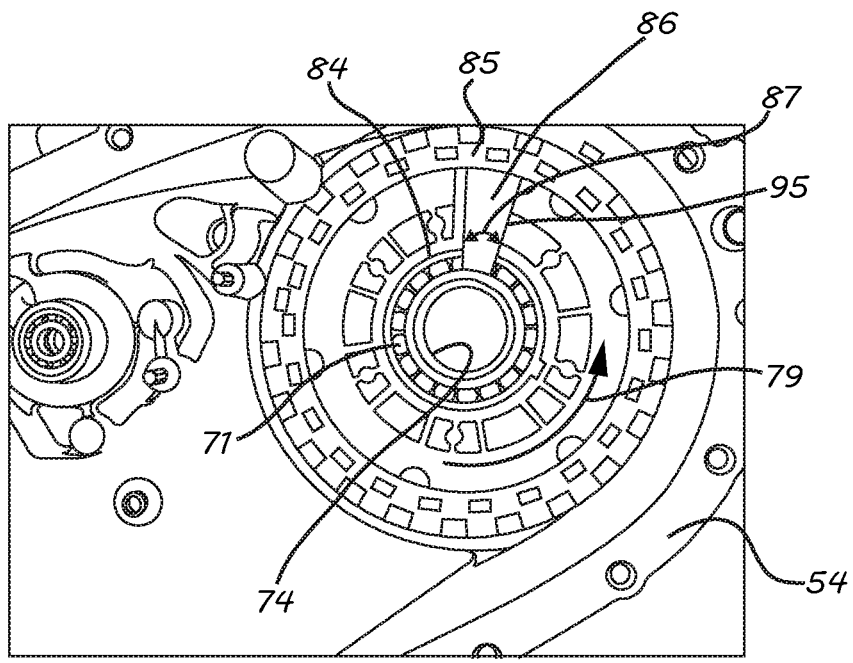
FIG. 4 is a partial outline illustration of a section of a transfer case according to a number of variations.

With reference to FIG. 3, in a number of variations the bearing 71 and the seal assembly 73 may be fixed to the case 54 in the section 55 around an opening 74 through which the input shaft 62 extends when assembled. FIG. 3 shows the section 55 of the case 54 from the view of facing the opening 74 from what may be the inside of the case 54 when assembled. The case 54 at the section 55 may form the cup shaped extension 76 that may at least partially receive the planetary gear set 61, which may extend into the section 55 as shown in FIG. 2. Rotation of the planetary gear set 61 may cause lubricant existing in the extension 76 to travel in a flow direction 79. An inlet 80 may be provided as an opening in the extension 76 and may be positioned in a radial direction 53 outward from the bearing 71 relative to the center of the opening 74. The radial direction may extend outward from the center of rotation of the input shaft 62. The inlet 80 may provide a flow path around the bearing 71 to its outboard side 81 (shown in FIG. 2). A dam 82 may extend across the extension 76 in the radial direction 53 and may be located adjacent the inlet 80 on its downstream side 83 relative to the flow direction 79. The dam 82 may extend between an inner circumferential wall 84 and an outer circumferential wall 85. The circumferential walls 84, 85 may extend in a circular shape around the opening 74. The dam 82 may assist in directing lubricant into and through the inlet 80. With reference to FIG. 4, in a number of variations a baffle 86 may extend over the inlet 80 on its inboard side when viewed from inside the case 54. In the radial direction 53, the baffle 86 may extend between the inner circumferential wall 84 and the outer circumferential wall 85. The baffle 86 may extend from the dam 82 in an upstream direction opposite the flow direction 79. Lubricant moving in the flow direction 79 may be captured behind (outboard), the baffle 86 and may move toward and through the inlet 80. The baffle 86 may extend around the flow direction 79 an angular distance 87 sufficient to capture lubricant when the product 52 is tilted, which may be at least fifteen angular degrees, and may vary depending on the application.

Figure 5:
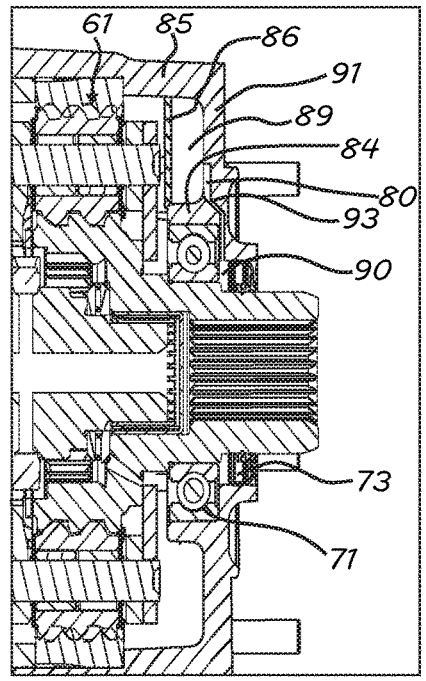
FIG. 5 is a partial outline illustration of a transfer case showing a bearing and seal area according to a number of variations.
Figure 6:
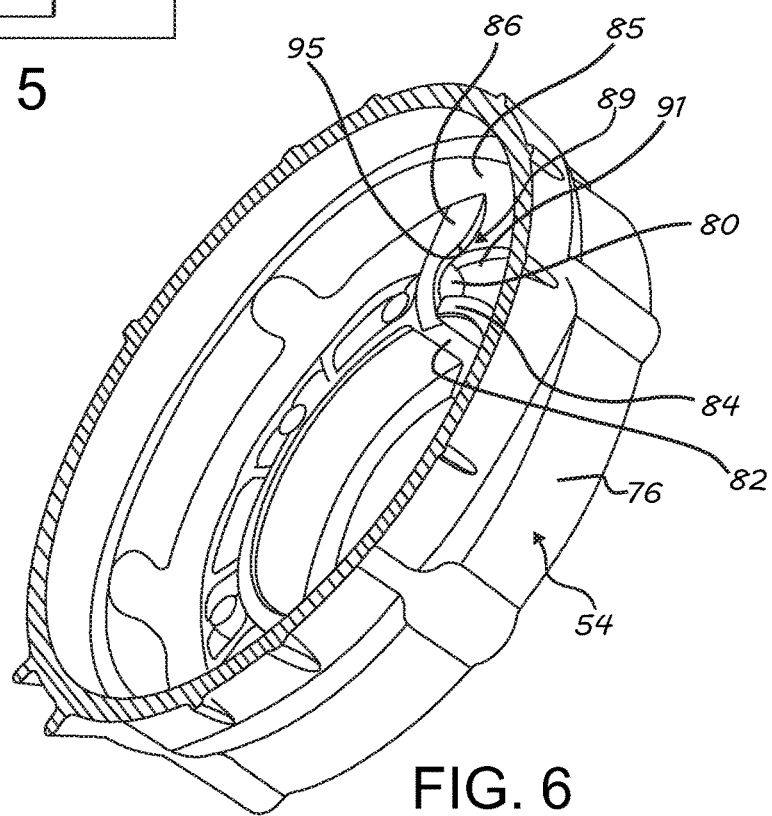
FIG. 6 is a partial sectional illustration of a case showing the bearing and seal area of a transfer case according to a number of variations.

In a number of variations as shown in FIGS. 5 and 6, the baffle 86 may define a contained space 89 between the inner circumferential wall 84 and the outer circumferential wall 85 and between the baffle 86 and the case 54 at an end wall 91. The contained space 89 may be open on its upstream side 95 providing an opening to allow lubricant to enter the contained space 89. Opposite the upstream side 95 the contained space 89 may be closed by the dam 82. Once lubricant enters the contained space 89 on the upstream side 95 relative to the flow direction 79 (shown in FIGS. 3 and 4), additional lubricant following the flow direction 79 may force lubricant through the inlet 80 and into a gallery 93 to the area 90 between the bearing 71 and the seal assembly 73. The gallery 93 is an example of a flow path through the case 54 between the contained space 89 and the area 90. Additional or alternative flow paths may be provided to areas where the delivery of lubrication is desired.

Through the product 52, lubricant may be captured and directed to between an inlet bearing 71 and seal 73. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a case, and a shaft that rotates may extend into the case. A bearing may support the shaft at the case. A seal may be positioned around the shaft outboard from the bearing. The bearing may have a first side facing the seal and a second side facing away from the seal. The case may define an inlet to an area between the bearing and the seal. A baffle may extend over the inlet on the second side and radially outside the bearing.

Variation 2 may include the product according to variation 1 and may include a gear set positioned on the second side of the bearing.

Variation 3 may include the product according to variation 2 wherein the shaft may be engaged with the gear set and may rotate in a flow direction. A dam may extend from the case adjacent the inlet downstream in the flow direction. The baffle may extend into the flow direction from the dam.

Variation 4 may include the product according to variation 2 wherein the case may define an extension that may be cup shaped. The gear set may extend into the extension.

Variation 5 may include the product according to any of variations 1 through 4 and may include a second shaft that may extend in the case. A chain may connect the shafts.

Variation 6 may include the product according to any of variations 1 through 5 wherein the case may include an extension that may have an inner circumferential wall against the bearing and an outer circumferential wall spaced apart from the inner circumferential wall. The baffle may extend from the inner circumferential wall to the outer circumferential wall.

Variation 7 may include the product according to variation 6 and may include a dam that may extend between the inner circumferential wall and the outer circumferential wall and may be located adjacent the inlet. The baffle may extend from the dam.

Variation 8 may include the product according to variation 7 wherein the shaft may rotate in a flow direction and the baffle may extend into the flow direction from the dam.

Variation 9 may include the product according to variation 8 and may include a planetary gear set that may be positioned around the shaft and may be positioned on the second side of the bearing.

Variation 10 may include the product according to variation 9 and may include a second shaft. A chain may connect the shafts.

Variation 11 may involve a product that may include a case. An input shaft may extend into the case. A first output shaft may extend into the case. A second output shaft may extend into the case. A seal may seal the case around at least one of the shafts. A bearing may be positioned inside the case from the seal and may support the at least one of the shafts. The case may define an inlet that may open to a space between the bearing and the seal. A baffle may extend over the inlet to direct a lubricant through the inlet from inside the case.

Variation 12 may include the product according to variation 11 and may include a dam that may be formed by the case adjacent the inlet. The baffle may extend from the dam.

Variation 13 may include the product according to variation 12 wherein the at least one of the shafts may rotate in a flow direction that may circulate a lubricant inside the case in the flow direction. The baffle may extend from the dam and opposite the flow direction.

Variation 14 may include the product according to variation 13 wherein the at least one of the shafts may include the input shaft. A gear set may be positioned around the input shaft on an opposite side of the bearing from the seal.

Variation 15 may include the product according to variation 14 and may include an extension that may be cup shaped. The bearing and seal may be positioned within the extension.

The above description of select variations within the scope of the invention is merely illustrative in nature and, thus, variations or variants thereof are not to be regarded as a departure from the spirit and scope of the invention.

What is claimed is:

1. A product comprising a case, a shaft that rotates and extends into the case, a bearing supporting the shaft at the case, a seal positioned around the shaft outboard from the bearing, the bearing having a first side facing the seal and a second side facing away from the seal, the case defining an inlet to an area between the bearing and the seal, a baffle extending over the inlet on the second side and radially outside the bearing, and a second shaft extending in the case, and a chain connecting the shafts.

2. The product according to claim 1 further comprising a gear set positioned on the second side of the bearing.

3. The product according to claim 2 wherein the shaft is engaged with the gear set and rotates in a flow direction, and further comprising a dam extending from the case adjacent the inlet and downstream in the flow direction, wherein the baffle extends into the flow direction from the dam.

4. The product according to claim 2 wherein the case defines an extension that is cup shaped and supports the bearing, and wherein the gear set extends into the extension.

5. The product according to claim 1 wherein the case includes an extension with an inner circumferential wall against the bearing and an outer circumferential wall spaced apart from the inner circumferential wall, wherein the baffle extends from the inner circumferential wall to the outer circumferential wall.

6. The product according to claim 5 further comprising a dam extending between the inner circumferential wall and the outer circumferential wall and located adjacent the inlet, the baffle extending from the dam.

7. The product according to claim 6 wherein the shaft rotates in a flow direction and the baffle extends into the flow direction from the dam.

8. The product according to claim 7 further comprising a planetary gear set positioned around the shaft and positioned on the second side of the bearing.

9. The product according to claim 8 further comprising a second shaft and a chain connecting the shafts.

10. A product comprising a case, an input shaft extending into the case, a first output shaft extending into the case, a second output shaft extending into the case, a seal sealing the case around at least one of the shafts, a bearing positioned inside the case from the seal and supporting the at least one of the shafts, wherein the case defines an inlet opening to a space between the bearing and the seal, and a baffle extending over the inlet to direct a lubricant through the inlet from inside the case.

11. The product according to claim 10 further comprising a dam formed by the case adjacent the inlet, the baffle extending from the dam.

12. The product according to claim 11 wherein the at least one of the shafts rotates in a flow direction and circulates a lubricant inside the case in the flow direction, the baffle extending from the dam and into the flow direction.

13. The product according to claim 12 wherein the at least one of the shafts includes the input shaft and further comprising a gear set positioned around the input shaft and on an opposite side of the bearing from the seal.

14. The product according to claim 13 further comprising an extension of the case that is cup shaped and within which the bearing and seal are positioned.

* * * * *